Figure 1:
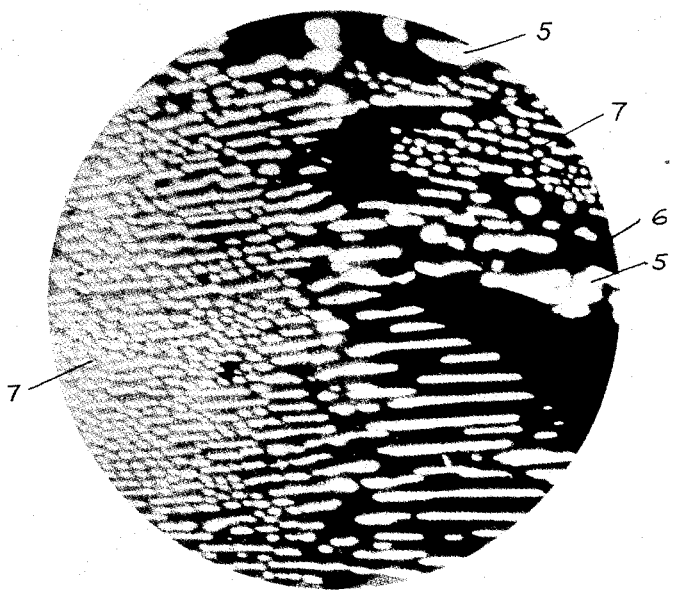

May 21, 1940.  J. A. BOYER ET AL  2,201,150

HARD CARBIDE COMPOSITION

Filed Feb. 18, 1938

INVENTORS.
JOHN A. BOYER.
CARL G. ROSE.
BY
ATTORNEY.

Patented May 21, 1940

2,201,150

UNITED STATES PATENT OFFICE 2,201,150

HARD CARBIDE COMPOSITION

John A. Boyer, Niagara Falls, and Carl G. Rose, Lewiston, N. Y., assignors to The Carborundum Company, Niagara Falls, N. Y., a corporation of Delaware Application February 18, 1938, Serial No. 191,280

15 Claims. (Cl. 106—1)

This invention relates to abrasive or wear-resistant materials composed of hard carbides, and especially to compositions in which difficultly fusible carbides are obtained in crystalline form. The invention further relates to fusion products in which a difficultly fusible carbide has crystallized from a carbide which is more easily fused, and especially to fusion products of boron carbide with vanadium and/or columbium and/or tantalum carbides.

Although it is known that the carbides of vanadium, columbium and tantalum are extremely hard, prior to our invention they had not been obtained in a form which was practical for use as a commercial abrasive.

These hard carbides are ordinarily prepared by reduction, without the carbide passing through the liquid state, and the product is obtained in the form of extremely fine powder. These particles of powder must be sintered together (usually with the addition of one or more metals) in order to obtain a solid mass. This sintering of the individual particles gives a solid mass which has neither the continuity nor the physical properties of a fused crystalline material. Fusion of these carbides is attended with extreme difficulty since their fusion temperatures approach the temperature of the electric arc and no container is known which will withstand the temperature necessary to produce fusion and which, at the same time, will not introduce contaminating impurities into the melt. Moreover, in attempting to fuse the materials with an electric arc, the carbides usually pick up an excess of carbon from the arc itself.

We have found, however, that mixtures of boron carbide and one or more of the carbides of vanadium, columbium and tantalum can be readily prepared by reduction of a mixture of the oxides of these elements in a resistance type furnace. We have further found that mixtures of boron carbide and one or more of the carbides of vanadium, columbium and tantalum can be fused into a homogeneous melt without substantial contamination with impurities and that upon the solidification of the melt the vanadium, columbium and tantalum carbides can be obtained in a form which is characteristic of single crystals rather than as an aggregate of sintered particles of powder.

In attempting to reduce the oxides of these carbide forming elements in a resistance type furnace, the oxide usually does not melt, and with the reaction of the loose powder with carbon, the carbide is produced not as appreciably sized crystals but as a very finely divided material. If the oxides are fluxed with boric oxide, however, it is possible to obtain crystals of the respective carbides in conjunction with boron carbide, which in itself is not usually an objectionable impurity since boron carbide is also an extremely hard abrasive material.

The nature of the final product, in any case, will depend to a considerable extent upon the temperature to which the material is heated and upon the composition of the original mix. When furnace charges comparatively high in boric oxide are used or when the resulting carbides are heated to a comparatively high temperature, it is possible to obtain a product which has been completely melted and in which the carbides have crystallized from the fused mass. With lower percentages of boric oxide in the furnace charge or with temperatures somewhat lower than those required to produce complete fusion of the reduced products, products can be obtained in which distinct crystals of the respective carbides are intermingled with boron carbide but in which the mass has not been completely melted.

The size of the crystals produced depends upon the size of the furnace used, and it is possible to obtain crystals in a resistance type furnace which are quite large. Even in a small furnace, however, the crystals are of visible size and are many times the size of the powder particles of the difficultly fusible carbides in their ordinarily produced state. These crystals can be produced in euhedral form, i. e., well developed so far as crystal faces and edges are concerned.

When the carbide mixtures are prepared in accordance with our invention the difficultly fusible carbides occur in the mass as individual crystals instead of agglomerated particles of very fine powder. In products which have been completely fused these crystals are embedded in a hard, tough matrix which is principally boron carbide and the entire mass is therefore characterized by extreme hardness and the crystalline properties of the difficultly fusible carbides can be utilized for abrasive purposes by breaking the mass into suitably sized granules.

The accompanying drawing shows illustrative examples of the structure of products produced in accordance with our invention when the final products have been completely fused.

Figure 2:
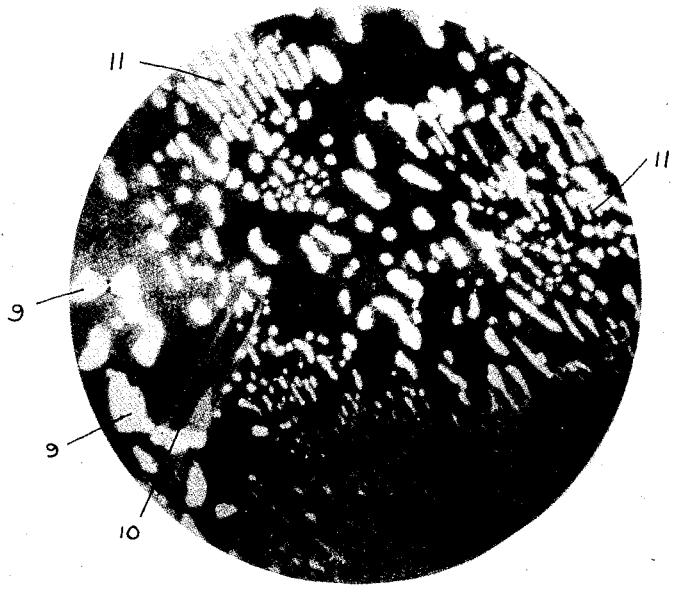

Figure 1 shows a microstructure of a boron carbide-vanadium carbide fusion product containing approximately 40 per cent vanadium carbide; and Figure 2 shows the microstructure of a boron carbide-tantalum carbide fusion product containing approximately 40 per cent tantalum carbide.

Referring to the drawing 5 and 9 represent crystals of the difficultly fusible hard carbides which are embedded in a matrix 6, 10 of boron carbide fusion product from which they have crystallized. At 7 and 11 are shown crystalline deposits of the hard carbides which have a eutectic structure.

In the absence of thermal curves, it is impossible to state definitely whether the structure is that of a true eutectic or of a eutectoid, which results from the decomposition of a solid phase into two constituents. The two structures as is well known, are very similar. It is sufficient for descriptive purposes, however, to state that the materials have a eutectic structure and it is in this sense that the term is used in this application.

While we have illustrated in the drawing, the microstructure of products containing approximately 60 per cent boron carbide it is to be noted that our invention is not limited to products having that percentage composition since the composition can be varied within wide limits. Furnace charges yielding a product having a boron carbide content of from about 15 to about 50 per cent are well suited for use in producing the euhedral crystals, previously referred to without complete melting of the carbide mixture; and charges yielding a product having a boron carbide content of from about 50 to about 85 per cent are suitable for use in producing fusions of the carbides.

The most practical method of producing the fused carbide compositions herein described is the simultaneous reduction of the respective oxides with carbon. In carrying out this process a resistance type furnace similar to that ordinarily used for making silicon carbide or boron carbide can be employed. In furnaces of this type, a conducting core of solid carbon is buried within a loose granular mixture of the respective oxides and carbon.

A mix containing boric oxide when heated in a furnace of this type usually becomes somewhat "pasty" and the gas pressure or vaporization within the mix causes the mixture to swell out or separate from the core so that contamination with carbon is entirely prevented. The core is heated to a temperature sufficiently high to fuse at least a portion of the reduced carbide mixture surrounding it and when the charge is removed from the furnace a layer of fused material is obtained surrounding the cavity formed around the core. The mix used in the original furnace charge is approximately in the stoichiometric proportions to give the respective carbides desired in the fusion.

It has been found in the commercial manufacture of boron carbide that the addition of a volatile liquid such as kerosene to the mix used in charging the furnace has a desirable effect upon the operation of the furnace, and such a procedure can of course be employed in the reduction of mixed oxides. The addition of kerosene seems to minimize the bloating of the mix and also facilitates the forming of "cracks" through which gases can escape.

As an alternative method for producing the fused carbide compositions the mixture of oxides and carbon can be heated by means of an overhead carbon resistor, the unfused charge being used as a container for the melt. In the operation of the process in this way, since the fusion temperature of the boron carbide is so low as not to require temperatures at which carbon is very volatile, there is little or no contamination of the product caused by the carbon of the resistor. The charge must, of course, be protected from oxidation during the melting process.

We have found that somewhat denser products may be obtained by powdering the product obtained by either of the above disclosed procedures, and reheating the powdered material with a substantial proportion of a mixture such as used for the original furnace charge.

We have found that extremely careful regulation of the oxide-carbon ratio in the furnace charge is unnecessary in many cases since with a deficiency of carbon it is possible to produce compositions in which borides of the respective elements are present. Since these borides are also extremely hard the products obtained will also be valuable as abrasive and wear resistant materials. By suitable regulation it is further possible to obtain compositions in which these borides occur in a boron carbide matrix or in which free boron is present. It will be obvious that the compositions deficient in carbon will be free from graphite with no tendency toward the granular fracture often caused by the presence of graphite.

As has been previously mentioned, products containing boron carbide and a mixture of carbides of vanadium and/or columbium and/or tantalum may be produced. In such mixtures, by suitably adjusting the proportions of the ingredients, products with comparatively different characteristics may be obtained. As an example of such a product may be mentioned the product obtained by reducing the mixed oxides of tantalum and columbium, obtained from columbite-tantalite (an ore consisting principally of mixed metal tantalates and columbates), with carbon by either of the procedures heretofore set forth. These mixed oxides are much less expensive as a raw material than the comparatively pure tantalum or columbium oxides ordinarily used in preparing carbides of these metals, and the product obtained is very hard and suitable for use as an abrasive.

There are a number of other methods by which the various fusions described can be prepared as, for example, by fusion of a mixture of the respective carbides in powdered condition and preferably in briquetted form. In this method the boron carbide, having a comparatively low melting point, serves as a flux for the difficultly fusible carbide or carbides.

All of the fusions herein described can be utilized for the manufacture of molded products by crushing or powdering the fused material, molding it to shape, and heating the molded article to a temperature sufficient to produce either sintering or incipient fusion. Most of the fusions described do not have sharp melting points, but melt over a considerable range of temperatures. When such materials are heated, they usually pass through a more or less pasty or partially fused stage before complete fluidity is reached. This property is of advantage in making self-bonded articles, since with a material which has a definite melting point there is an abrupt change from the solid to the fluid state. In the latter case the material passes from solid to liquid without a change in temperature when the melting point of the material is reached.

With materials of the "alloy" type, where the incipient fusion temperature is below the temperature of complete fusion, the material can be kept in a partially fused condition for an indefinite time without further fusion taking place, and much less accurate temperature control is needed to produce partial or incipient fusion without loss of shape. These carbide compositions are also adapted to sintering or self-bonding under pressure. The powdered prefused or "alloyed" materials, or mixtures of the individual carbides, can also be melted or partially melted under pressure to give dense products characterized by extreme hardness and resistance to wear.

This application is a continuation, in part, of our copending application, Serial No. 12,588 filed March 23, 1935, now Patent No. 2,108,794, issued Feb. 22, 1938.

Having thus described our invention, we claim:

1. As a new article of manufacture a fused carbide composition consisting essentially of boron carbide and a difficultly fusible carbide of the group consisting of vanadium, columbium and tantalum carbides in which the difficultly fusible carbide is present as a separate crystalline phase which has solidified from a fused mass.

2. As a new manufacture a fused carbide composition consisting essentially of boron carbide and vanadium carbide in which the vanadium carbide is present as a separate crystalline phase which has solidified from a fused mass.

3. As a new manufacture a fused carbide composition consisting essentially of boron carbide and columbium carbide in which the columbium carbide is present as a separate crystalline phase which has solidified from a fused mass.

4. As a new manufacture a fused carbide composition consisting essentially of boron carbide and tantalum carbide in which the tantalum carbide is present as a separate crystalline phase which has solidified from a fused mass.

5. As a new manufacture a fusion of boron carbide and a difficultly fusible carbide of the group consisting of vanadium, columbium and tantalum carbides in which the difficultly fusible carbide occurs at least in part in the form of microscopic particles distributed throughout a matrix in which boron carbide is the principal constituent.

6. As a new manufacture a composition consisting of boron carbide and a difficultly fusible carbide of the group consisting of vanadium, columbium and tantalum carbides in which at least a part of the difficultly fusible carbide is crystallized in a form which is characteristic of a eutectic.

7. As a new manufacture a composition consisting of boron carbide and vanadium carbide in which at least a part of the vanadium carbide is crystallized in a form which is characteristic of a eutectic.

8. As a new manufacture a composition consisting of boron carbide and columbium carbide in which at least a part of the columbium carbide is crystallized in a form which is characteristic of a eutectic.

9. As a new manufacture a composition consisting of boron carbide and tantalum carbide in which at least a part of the tantalum carbide is crystallized in a form which is characteristic of a eutectic.

10. As a new manufacture a fusion of boron carbide and a difficultly fusible carbide of the group consisting of vanadium, columbium, and tantalum carbides in which the difficultly fusible carbide occurs partly in a form characterized by a eutectic structure and partly as distinct crystals, both the eutectic particles and the distinct crystals being distributed throughout a matrix which is essentially boron carbide.

11. As a new manufacture a fused carbide composition consisting essentially of boron carbide, columbium carbide and tantalum carbide in which the columbium and tantalum carbides are present in a separate crystalline phase which has solidified from a fused mass.

12. As a new manufacture a composition resulting from high temperature reduction consisting essentially of boron carbide and a difficultly fusible carbide of the group consisting of vanadium, columbium, and tantalum carbides in which the difficultly fusible carbide occurs as distinct crystals intermingled with a boron carbide fusion product.

13. As a new manufacture a composition resulting from high temperature reduction consisting essentially of boron carbide and vanadium carbide in which the vanadium carbide occurs as distinct crystals intermingled with a boron carbide fusion product.

14. As a new manufacture a composition resulting from high temperature reduction consisting essentially of boron carbide and columbium carbide in which the columbium carbide occurs as distinct crystals intermingled with a boron carbide fusion product.

15. As a new manufacture a composition resulting from high temperature reduction consisting essentially of boron carbide and tantalum carbide in which the tantalum carbide occurs as distinct crystals intermingled with a boron carbide fusion product.

JOHN A. BOYER.
CARL G. ROSE.